United States Patent
Corcoran, III

(10) Patent No.: US 7,209,050 B2
(45) Date of Patent: Apr. 24, 2007

(54) AUTOMATIC VEHICLE COLLISION AVOIDANCE AND WARNING SYSTEM

(76) Inventor: James John Corcoran, III, 12258 N. 120th St., Scottsdale, AZ (US) 85259

(*) Notice: Subject to any disclaimer, the term of this patent is extended or adjusted under 35 U.S.C. 154(b) by 193 days.

(21) Appl. No.: 10/908,214

(22) Filed: May 2, 2005

(65) Prior Publication Data
US 2006/0244632 A1 Nov. 2, 2006

(51) Int. Cl.
G06F 17/10 (2006.01)
G06G 7/78 (2006.01)
G08G 1/16 (2006.01)
B60Q 1/00 (2006.01)
G08B 13/14 (2006.01)

(52) U.S. Cl. .............. 340/902; 340/903; 340/436; 340/572.1; 700/301

(58) Field of Classification Search ........ 340/901–903, 340/435–437, 453, 467, 469, 568.1, 572.9; 701/300–302, 70–98; 180/271–278; 280/734, 280/735
See application file for complete search history.

(56) References Cited
U.S. PATENT DOCUMENTS 5,684,474 A * 11/1997 Gilon et al. ............... 340/903
6,268,804 B1 * 7/2001 Janky et al. ............... 340/903
6,851,504 B2 * 2/2005 Campbell et al. .......... 180/271

* cited by examiner

Primary Examiner—Benjamin C. Lee
Assistant Examiner—Jennifer Mehmood

(57) ABSTRACT

An integrated system for automatic vehicle collision avoidance and warning for vehicles operating on any highway or road system globally. The system may be used to not only illuminate the brake lights on the following vehicle but also to begin the application of braking pressure as a result of analysis of the speed of the vehicle. The system includes an RFID transponder (either active or passive) located in the rear and front of the vehicle with discrete recognition capability as to vehicle proximity and resulting action to be taken as a result of driver action. On the vehicle either the brake lights will be illuminated ahead of any actual driver action; an initial application of brake pressure as a result of receiving a signal from the vehicle in front, the pressure which is determined by analysis of the current speed of the vehicle or the system will provide additional warning through brake light illumination to the following vehicle with similar equipment and cruise control will be disengaged. The system can be retrofitted into existing vehicles to provide, at a minimum, brake light illumination indicating an action being taken somewhere ahead of your vehicle. The system thereby warns and prevents serious rear-end collisions at highway speeds especially where vehicle size mismatch contributes to the inability of the following driver to see activity in front of the car in front of him.

2 Claims, 2 Drawing Sheets

SYSTEM OPERATION DIAGRAM

SYSTEM FLOW DIAGRAM

AUTOMATIC VEHICLE COLLISION AVOIDANCE AND WARNING SYSTEM

BACKGROUND OF THE INVENTION

Over the years vehicles have become larger and highways have become more crowded. In an effort to combat the higher incidents of rear-end collisions, various education campaigns have been undertaken by the Federal Highway Administration. An example is one car length per ten miles per hour of speed rule-of-thumb to avoid rear-ending another vehicle. In a review of the IVHS (Intelligent Vehicle Highway System) model of the future, vehicles will have the potential to control more of their actions on the highway without driver intervention or action. On-board processors have become a reality in the vehicles of today. With the advent of ABS (Anti-skid braking systems), vehicles have taken the first step toward processor assisted braking control for the driver of today.

BRIEF SUMMARY OF THE INVENTION

As mentioned, size differences between trucks, automobiles and between automobiles of various classes is a problem pointed out in the investigation of rear-end collisions. The driver of an average size automobile has a problem with seeing what is happening in front of the vehicle in front of him. This is made even worse through the use of extensive window tinting. Early warning of an impending braking action is either limited severely or gone altogether. This system, AVCAWS (Automatic Vehicle Collision Avoidance and Warning System), will provide a phased approach to eliminating or mitigating this problem on the modern highways and assist in the control of traffic in the highways of the future.

DETAILED DESCRIPTION OF THE INVENTION

Figure 1:
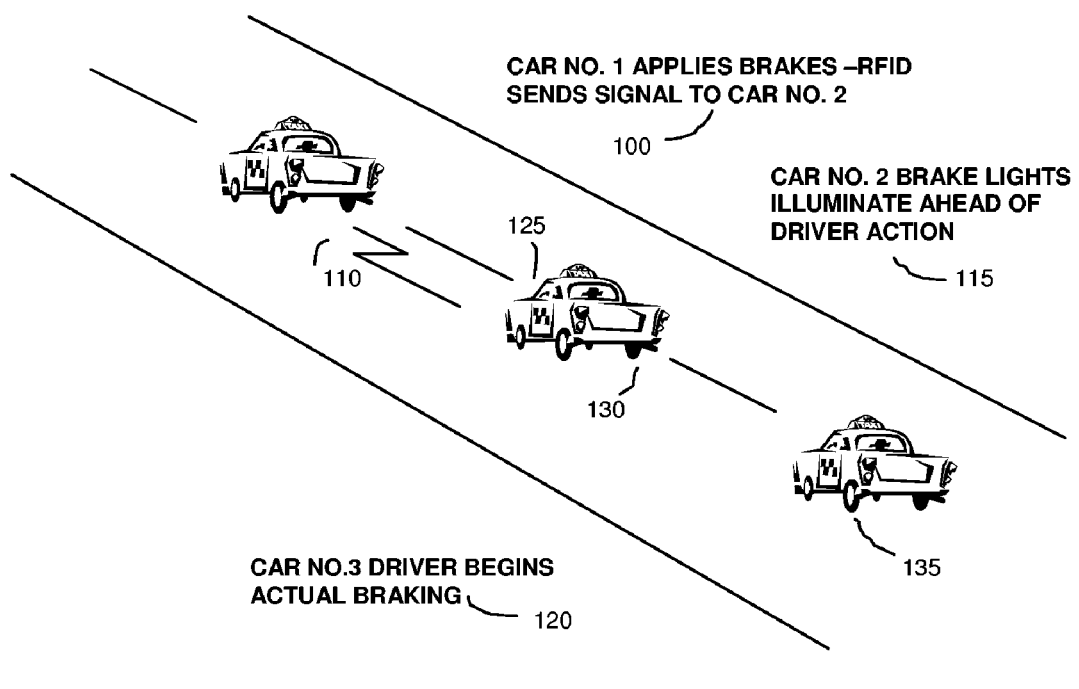
FIG. 1 depicts the system operation diagram of braking action between leading and trailing vehicles.

In the basic embodiment of this invention (FIG. 1), System Operation, car No. 1 begins the process by applying the brakes (100). As the brakes are being applied in car No. 1, an on-board active RFID (radio frequency identification system) located in the rear tail light assembly, is transmitting a signal (110) that is received by the active transponder RFID located in the headlight assembly on car No. 2 (125). Car No. 2's brake lights are automatically illuminated (115). Car No. 3's (135) driver begins to actually apply the brakes (120) thereby taking action ahead of the actual visual slowing of car No. 2 (130). This series of events prevents a total surprise to the driver of car No. 3 since the brake lights of car No. 1 are not visible to the driver of car No. 3 due to the size and the height mismatch of the class of vehicles. Active RFID power limitation and discrete recognition frequency and code prevents false signal representation across multiple lanes of traffic.

In the IVHS of the future, another enhanced embodiment is that the processor in car No. 2 (130) would look at the speed of the vehicle and begin to apply the brakes automatically before the driver could take action. The same event would take place in car No. 3 (135) through a similar active RFID transmitting to car No. 3 and the brakes would be applied as a result of analyzing the current speed and when the driver finally reacts to the brake lights illuminating on car No. 2 the driver would continue the brake application from the current applied brake pressure as already applied by the automatic system. This would also disengage the cruise control system as well.

We therefore have a system that takes both pre-emptive action and also provides a signal that requires a driver to take physical action as well. It is an invention that would be capable of not only saving lives in the initial embodiment but also provide a tool to be retrofitted into existing vehicles during routine maintenance visits.

This invention could apply to not only automobiles but trucks and other typical over-the-road vehicles operated around the globe.

Figure 2:
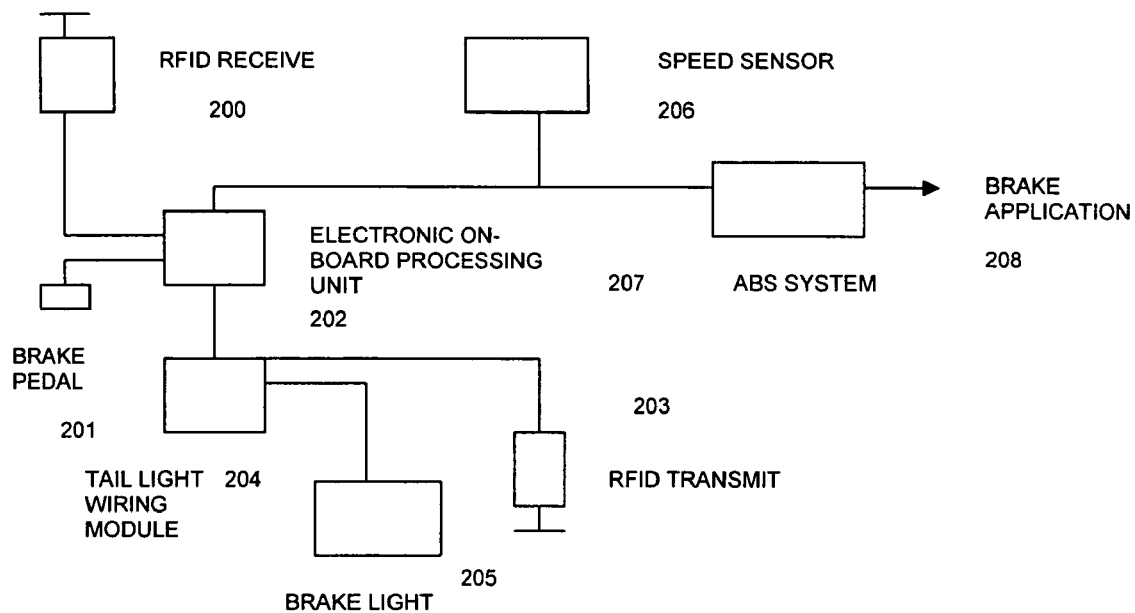
FIG. 2 depicts the system flow diagram of braking action within leading and trailing vehicles.

A detailed block diagram, FIG. 2, shows how AVCAWS would be connected on the vehicle. Active RFID receive (200) in the head light assembly, would send a signal to the on-board processor (202). The processor would send a signal to the tail light wiring module (204) to illuminate the rear tail lights (205) and also activate the active RFID located in the rear tail light assembly (203). In the enhanced embodiment, the on-board processor (202) would take additional input from the speed sensor (206) and a signal would be sent to the ABS (anti-skid braking system) (207) and it would apply the brakes automatically (208) and disconnect the cruise control, if engaged, at that time.

Detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art how to employ the present invention in an appropriately detailed system, structure or manner.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense and all such modifications are intended to be included within the scope of the present invention.

In addition, benefits, other advantages, and solutions to problems, and any element(s) what may cause any benefit, advantage, or solution to occur or become more pronounced are not to be construed as critical, required, or essential feature or element of any or all the claims. As used herein, the terms "comprises," "comprising" or any other variation thereof are intended to cover non-exclusive inclusion, such that a process, method, article, or apparatus that comprises a list of elements does not include only those elements but may include other elements not expressly listed or inherent to such process, method, article, or apparatus.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An integrated system for automatic vehicle collision avoidance and warning system for vehicles, said system comprising:
- an automatic vehicle collision avoidance and warning system having a RFID transponder located on a first vehicle to enable communications to a receiving vehicle with an RFID transponder and receiver installed;
- wherein the first vehicle provides a communication signal indicating a braking action being taken by the first vehicle;
- wherein the RFID transponder of a first vehicle is electrically connected to the braking system of the first vehicle and provides an indication of braking activity through a signal to the receiving vehicle with an RFID transponder and receiver through the similar illumination of brake lights;
- a means for electrically connecting to an existing brake system in order to analyze the speed and have the brake system apply the brakes prior to a driver taking action and also disconnect the cruise control;
- a means to electrically connect to an existing brake light system on the first and receiving vehicles;
- a means to allow the driver of the receiving vehicle to apply brake pressure from an existing pressure application initially applied by a signal and speed analysis of the system;
- a means to distinguish a difference through either discrete frequency or identification as to whether the system is providing the signal from the first vehicle's transponder for purposes of brake light illumination or receiving the signal at the receiving vehicle.

2. A process for automatic vehicle collision avoidance and warning system comprising: a RFID transponder system located on one or more of a leading and trailing vehicle that electrically connects with the a brake and brake lighting system a speedometer system and a cruise control system; wherein said process allows the illumination of the brake lighting system prior to driver action on trailing vehicles that are following leading vehicles during highway traffic patterns;
- electrically connecting to the brake and brake lighting system of trailing and leading vehicles including the brake lights and the speedometer system;
- providing an early warning brake light to a trailing vehicle equipped with an RFID transponder and receiver enabling the trailing driver'vehicle to be aware of braking activity on the leading vehicle;
- providing a an electrical connection to the brake and brake lighting system on the trailing vehicle in order to begin early application of brake pressure to prevent rear-end collisions;
- providing an electrical connection to a speedometer system on the trailing vehicle in order to analyze the amount of brake pressure to be applied as a result of receiving a signal from the RFID transponder on said leading vehicle.

* * * * *